United States Patent
Okada et al.

(10) Patent No.: US 7,308,332 B2
(45) Date of Patent: Dec. 11, 2007

(54) VIRTUAL CLOTHING MODELING APPARATUS AND METHOD

(75) Inventors: Ryuzo Okada, Kanagawa-ken (JP); Nobuhiro Kondo, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/372,035

(22) Filed: Mar. 10, 2006

(65) Prior Publication Data

US 2006/0202986 A1   Sep. 14, 2006

(30) Foreign Application Priority Data

Mar. 11, 2005   (JP) ............... P2005-069581

(51) Int. Cl.
*G06F 19/00*   (2006.01)
(52) U.S. Cl. .................. 700/130; 345/419; 345/473; 345/629; 345/630; 345/582
(58) Field of Classification Search .......... 700/130, 700/131, 132, 133; 705/26, 27; 345/418, 345/419, 420, 426, 629, 630, 582, 473, 474, 345/475

See application file for complete search history.

(56) References Cited

U.S. PATENT DOCUMENTS

| | | | | |
|---|---|---|---|---|
| 4,539,585 | A * | 9/1985 | Spackova et al. | 382/100 |
| 4,731,743 | A * | 3/1988 | Blancato | 345/632 |
| 5,680,528 | A * | 10/1997 | Korszun | 345/630 |
| 5,930,769 | A * | 7/1999 | Rose | 705/27 |
| 5,937,081 | A * | 8/1999 | O'Brill et al. | 382/111 |
| 6,307,568 | B1 * | 10/2001 | Rom | 345/629 |
| 6,310,627 | B1 * | 10/2001 | Sakaguchi | 345/630 |

(Continued)

FOREIGN PATENT DOCUMENTS

JP   9-44556   2/1997

(Continued)

OTHER PUBLICATIONS

Hoshino et al.; "Building Virtual Fashion Simulator by Merging CG and Humans in Video Sequences"; ISPJ Journal, vol. 42, No. 5, pp. 1182-1193, (2001) [English Translation].*

(Continued)

*Primary Examiner*—Gary L. Welch
*Assistant Examiner*—Nathan E Durham
(74) *Attorney, Agent, or Firm*—Finnegan, Henderson, Farabow, Garrett & Dunner, L.L.P.

(57) ABSTRACT

Trying on the clothes is simulated by processing an image sequence by using a posture dictionary, and a three-dimensional figure, obtained in advance, of a person who wishes to try on clothing. The process includes estimating the posture of the person, and simulating the motions of the clothes, in agreement with estimated time series posture data. A virtual modeling apparatus comprises an imaging device configured to take an image sequence, a posture-estimator which estimates the posture of a person in the image sequence from the three-dimensional figure data of the person and from data for various postures, a posture corrector which generates smooth and natural posture time series data from the time series of estimated postures, a clothes simulator which calculates the motions of the clothing being modeled, and a display device which displays images of the person as if they were actually wearing the clothing.

10 Claims, 6 Drawing Sheets

U.S. PATENT DOCUMENTS

| | | | |
|---|---|---|---|
| 6,404,426 B1 * | 6/2002 | Weaver | 345/419 |
| 6,546,309 B1 * | 4/2003 | Gazzuolo | 700/132 |
| 6,633,289 B1 | 10/2003 | Lotens et al. | |
| 6,901,379 B1 * | 5/2005 | Balter et al. | 705/27 |
| 7,092,782 B2 * | 8/2006 | Lee | 700/132 |
| 7,149,665 B2 * | 12/2006 | Feld et al. | 703/2 |
| 2002/0188372 A1 * | 12/2002 | Lane et al. | 700/130 |
| 2003/0101105 A1 * | 5/2003 | Vock | 705/27 |
| 2004/0083142 A1 * | 4/2004 | Kozzinn | 705/27 |

FOREIGN PATENT DOCUMENTS

| | | | |
|---|---|---|---|
| JP | 3314704 | | 6/2002 |
| JP | 2002269580 A | * | 9/2002 |
| JP | 2003-263632 | | 9/2003 |
| JP | 2003263632 A | * | 9/2003 |
| JP | 2004246729 A | * | 9/2004 |

OTHER PUBLICATIONS

Okada et al.; "Virtual Fashion Show Using Real-time Markerless Motion Capture"; http://mi.eng.cam.ac.uk/~bdrs2/pubs.html (2005 and 2006).*

Hoshino et al.; "Building Virtual Fashion Simulator by Merging CG and Humans in Video Sequences"; ISPJ Journal, vol. 42, No. 5, pp. 1182-1193, (2001).

Senior: "Real-Time Articulated Human Body Tracking Using Silhouette Information"; Proc. of IEEE Workshop on Virtual Survelllance, pp. 1-8, (2003).

Ng et al., "Computer Graphics Techniques for Modeling Cloth," IEEE Computer Graphics and Applications (Sep. 1996), pp. 28-41.

* cited by examiner

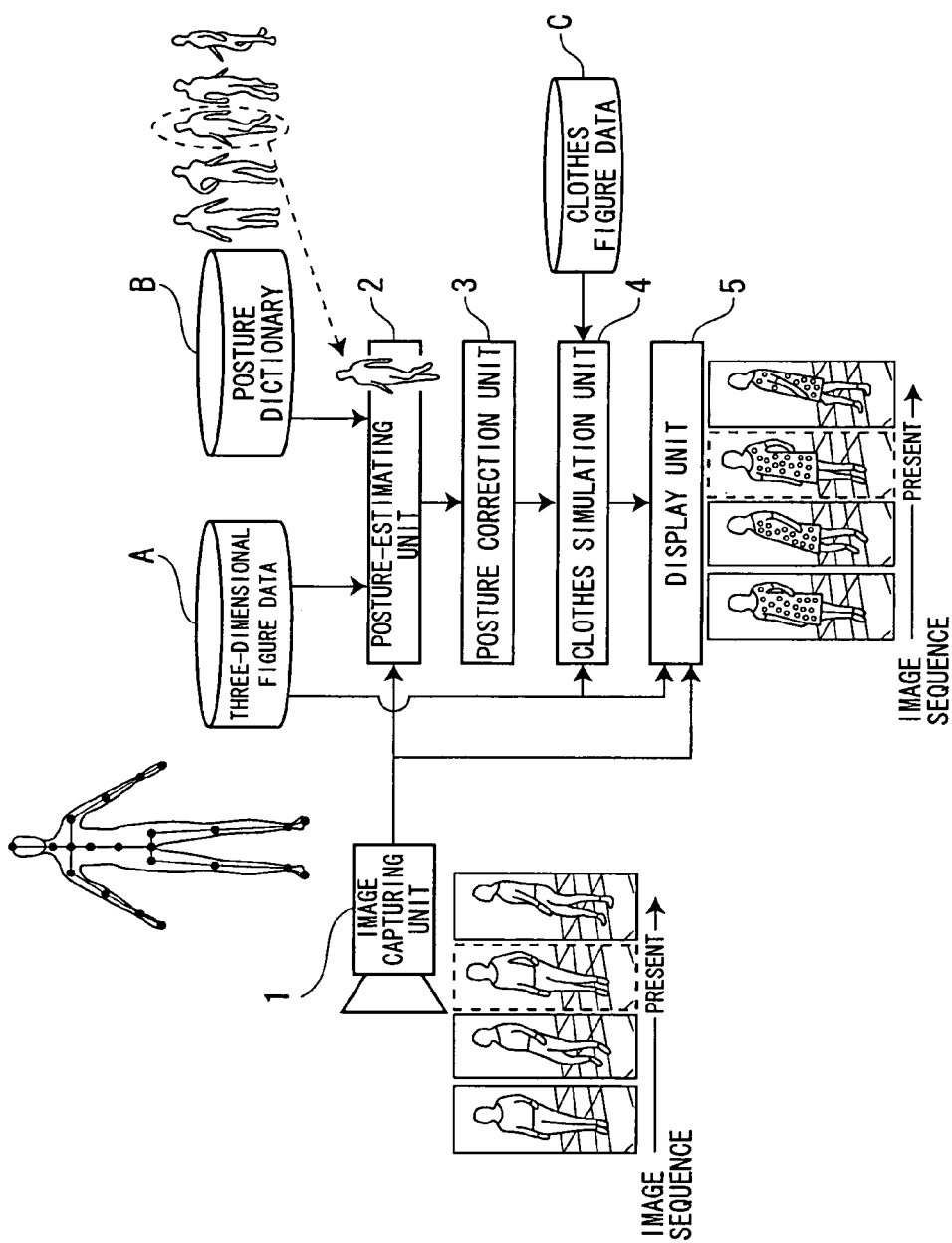
F I G. 1

VIRTUAL CLOTHING MODELING APPARATUS AND METHOD

CROSS REFERENCES TO RELATED APPLICATIONS

This application is based upon and claims the benefit of the prior Japanese Patent Application No. P2005-69581 filed on Mar. 11, 2005; the entire contents of which are incorporated herein by reference.

BACKGROUND OF THE INVENTION

1. Field of the Invention

The present invention relates to a virtual clothing modeling apparatus, and method implementable on a computer.

2. Description of the Related Art

Japanese Patent Application Publication(KOKAI) JP-A-9-44556 and Japanese Patent No. P3314704 disclose virtual clothing modeling apparatuses which form clothing images by using figure data (height, weight, contour, etc.) of the person trying on clothing as obtained from images of the person, and then forming images which simulate how the person will actually appear when wearing the clothing. These methods obtain the figure data of the person to simulate the figure when wearing the clothing, but the methods are not capable of reflecting, on the clothes, the motion and posture of the person. Therefore, these methods cannot generate a dynamic image sequence of the person wearing clothes as they assume various poses.

J. Hoshino et al., "Building Virtual Fashion Simulator by Merging CG and Humans in Video Sequences", IPSJ Journal, Vol. 42, No. 5, pp. 1182-1193, 2001 discloses a method of calculating differences between a previous posture and the present posture from motion data of the image, and estimates the present posture by adding the differences to the past posture. According to this method, differences are added up successively and, hence, errors in the estimation of changes are accumulated. Therefore, the estimate fails when done over a long period of time.

As described above, conventional methods are not capable of reflecting, on the clothes, the motion (posture) of a person who is trying on the clothes. Methods which attempt to reflect changes in posture are not capable of estimating the posture over a long period of time.

SUMMARY OF THE INVENTION

In accordance with the present invention, there is provided a virtual clothing modeling apparatus comprising:

a camera to obtain an image sequence of a person who tries on clothing;

a storage unit to store clothes data including three-dimensional figures of clothes and patterns thereof, three-dimensional figure data of the person, and posture data of the person;

a posture-estimating unit to estimate the posture of the person in images within the image sequence by using the image sequence and the stored posture data;

a time series posture generating unit to generate a time series of postures by using the estimated postures of the person;

a clothes-simulating unit to estimate the motions of the clothes which are tried on by the person by using the three-dimensional figure data of the person, the clothes data, and the time series of postures;

a clothes image-generating unit to generate images of the clothes based on the estimated motions of the clothes; and a synthesizing unit to synthesize images of the clothes on the person in the image sequence by using the estimated motions of the clothes and the clothes data.

Also in accordance with the present invention, there is provided a computer readable medium storing a virtual clothing modeling computer program for causing a computer to execute instructions to perform steps of:

inputting the image sequence including a plurality of images of a person who tries on clothing;

making a reference to clothes data including three-dimensional figures of clothes and patterns thereof, three-dimensional figure data of the person, and posture data of the person stored in a storage unit;

estimating the posture data of the person in the images within the image sequence by using the image sequence and the posture data of the person;

generating time series posture data by using the estimated posture data of the person;

estimating the motions of the clothes tried on by the person by using the three-dimensional figure data of the person, the clothes data, and the generated time series posture data;

generating images of the clothes based on the estimated motions of the clothes; and synthesizing images of the clothes on the person in the image sequence by using the estimated motions of the clothes and the clothes data stored in the storage unit.

BRIEF DESCRIPTION OF THE DRAWINGS

FIG. 1 is a block diagram of a virtual clothing modeling apparatus according to an embodiment of the invention;

DESCRIPTION OF THE PREFERRED EMBODIMENT

Figure 2:
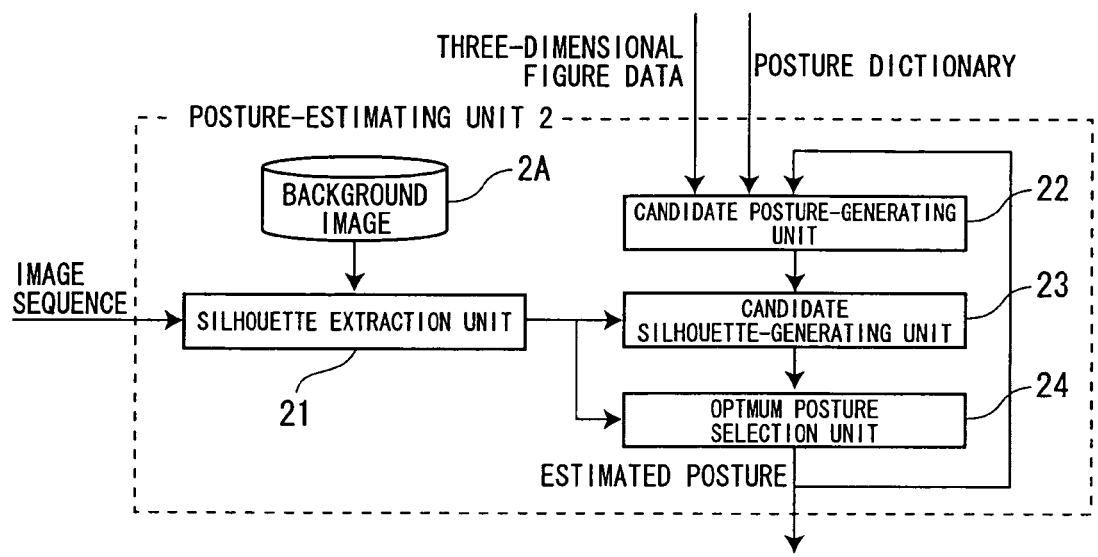
FIG. 2 is a block diagram of a posture-estimating unit.

A virtual clothing modeling apparatus according to an embodiment of the invention will now be described.

Embodiments consistent with the invention relate to a virtual clothing modeling apparatus for obtaining images of how a person will look in a particular item or items of clothing, using images of the person, without the person having to change his/her actual clothing. A virtual clothing modeling apparatus first estimates in real time the posture of a person who tries on clothes based on image processing using an image sequence. Then, the apparatus generates natural motion, and uses the image sequences to provide the person with a second image sequence revealing how the person would look if actually wearing the clothing.

The virtual clothing modeling apparatus of this embodiment displays images of clothing that a person wishes to try on being synthesized onto the body of the person. The clothing images are combined with the frames of an image sequence. The person evaluating the clothing can see how the clothing will appear on that person, without actually trying on the clothes. The virtual clothing modeling apparatus of this embodiment synthesizes the images of the clothes to be tried on by estimating the posture of the person. Therefore, the person can see his/her image in a desired posture as if he or she were actually trying on the clothes. As the person moves in front of the camera, the person can see his/her image, with the clothing, undergoing the same motion.

The virtual clothing modeling apparatus of this embodiment is capable of changing the clothes being tried on by simply using data for a different item of clothing. Therefore, the person is able to virtually try on clothing that is not physically present. Further, the person is able to easily evaluate clothing of different colors and patterns.

The virtual clothing modeling apparatus of this embodiment can be conveniently used in clothing shops. The apparatus is further useful for amusement purposes. For example, the apparatus can be used to play games where a person pretends to be a king, a princess, a nobleman or a knight, and moves around in a virtual three-dimensional space.

The constitution and operation of the virtual modeling apparatus of this embodiment will now be described with reference to the drawings.

FIG. 1 illustrates the constitution of the virtual clothing modeling apparatus according to the embodiment. Prior to virtually trying on the clothes by using the apparatus, the person is measured in advance by using a three-dimensional scanner or the like to obtain three-dimensional figure data A of the surface of their body. The three-dimensional figure data A includes data representing the positions of vertexes of polygons obtained by approximating the human body surface by a set of polygons, and data representing the positions of joints of the human body. Further, the posture data is obtained in advance by measuring various postures, using a motion capture system or similar system available in the market. The posture data includes a set of joint angles of the human body. Rotations of the joints of the human body can be expressed by three rotational angles rx, ry, rz (Euler angles) about the three-dimensional space axes. Therefore, if the human body has Nb joints to be considered, then, the posture data Pa of a posture a can be expressed as Pa={rx1, ry1, rz1, rx2, - - - , rzNb}. A posture dictionary B contains various posture data.

An image capturing unit 1 includes one or more cameras. The image capturing unit 1 is for taking images of the person who is to virtually try on the clothing. The image capturing unit 1 takes an image sequence of the person.

A posture-estimating unit 2 finds a feature of the person from the present image frame within the image sequence taken by the image capturing unit 1. By using this feature, the posture dictionary B, and the three-dimensional figure data A, the posture-estimating unit 2 estimates the posture of the person at the time corresponding to the present image frame.

A posture correction unit 3 corrects the time series data of the estimated posture into a smooth and natural motion. The posture correction unit 3 approximates the time series data of the rotational angles (elements of the posture data) of the joints. The approximation is done by fitting, for example, a first or a higher-order polynomial to smooth the posture changes of the person.

A clothes simulation unit 4 generates the motion of the clothing corresponding to the motion of the human body by using the time series corrected posture data and the clothes figure data C. The clothes figure data C includes, for example, the three-dimensional shape and the surface patterns of the clothing.

A display unit 5 projects, onto an image plane, the clothes figure data generated by the clothes simulation unit 4. Then the display unit 5 displays the projected data on the image sequence obtained by the image capturing unit 1.

FIG. 2 illustrates the interior of the posture-estimating unit 2. The posture-estimating unit 2 includes a silhouette extraction unit 21, a candidate posture-generating unit 22, a candidate silhouette generating unit 23, and an optimum posture selection unit 24. The silhouette extraction unit 21 is for extracting the silhouette of the person from the images captured by the image capturing unit 1. The candidate posture-generating unit 22 is for generating a human body model having various postures close to previously estimated postures. The postures in the model are similar to the observed silhouette positions, and are calculated by using the three-dimensional figure data A and the posture dictionary B. The candidate silhouette-generating unit 23 is for generating candidate silhouettes by projecting the generated candidate postures onto an image plane. The optimum posture selection unit 24 is for calculating the similarities between the observed silhouettes and the candidate silhouettes and for outputting the posture of the candidate silhouette that most resembles the estimated posture.

The posture-estimating unit 2 includes a storage medium for storing a background image 2A that has been taken in advance. The background image contains the background that is behind a person when they try on clothing.

The silhouette extraction unit 21 calculates the difference in brightness or color between the background image 2A and the image of the present frame. The silhouette extraction unit 21 obtains an observed silhouette by assigning a pixel value of 1 to those pixels having differences greater than a threshold value and by assigning a pixel value 0 to the other pixels. In the observed silhouette, the region where the pixels have a value of 1 is the region where the person is. In the processing that follows, the region where the pixel values are 1 is used as an inner region of the observed silhouette. This constitutes the most basic background subtraction method, although other background subtraction methods may be used.

The candidate posture-generating unit 22 selects a candidate posture resembling the estimated posture in the preceding frame out of the posture data in the posture dictionary B. The candidate posture-generating unit 22 computes the similarity between the posture a and the posture b as described below. The candidate posture-generating unit 22 finds the maximum absolute difference between the elements of posture data Pa and posture data Pb expressed by the rotational angles of the joints, i.e., finds the maximum absolute differential value between the rotational angles of the joint angles. The maximum value is a difference d1 between the posture a and the posture b. The candidate posture-generating unit 22 evaluates the similarity of the postures by using the difference d1.

The candidate posture-generating unit 22 calculates the difference d1 between the estimated posture in the preceding frame and the postures in the posture dictionary B. The candidate posture-generating unit 22 selects postures having a difference d1 smaller than the threshold value as candidate postures.

In order to evaluate the similarity of the postures, the candidate posture-generating unit 22 can use a difference d2 which is a maximum difference in the position of the joints projected onto the image plane, in addition to the difference d1 which is a maximum absolute value in the joint angles. Or, the candidate posture-generating unit 22 can use both the difference d1 and the difference d2.

When the candidate posture-generating unit 22 executes the processing for the initial frame, there is no estimated posture of the preceding frame. In this case, the candidate posture-generating unit 22 uses all postures in the posture dictionary B as candidate postures, or determines an initial posture in advance and uses it in place of the posture of the preceding frame.

The candidate posture-generating unit 22 generates a three-dimensional candidate model by varying the angles of joints of the three-dimensional figure data based on the posture data of candidate postures.

The candidate silhouette-generating unit 23 generates a candidate silhouette by projecting the three-dimensional candidate model onto the image plane.

When the image capturing unit 1 has multiple cameras, the candidate silhouette-generating unit 23 finds the centers of gravity of the observed silhouettes extracted from the camera images, and roughly calculates the three-dimensional position of the person based on the principle of triangulation. By using camera parameters such as focal lengths and the positional relationship among the cameras, the candidate silhouette-generating unit 23 locates the three-dimensional candidate models at the calculated three-dimensional positions, and projects the three-dimensional candidate models onto the image plane.

When the image capturing unit 1 has a single camera, the candidate silhouette-generating unit 23 determines the direction of the person based on the position of the center of gravity of the observed silhouette on the image. The candidate silhouette-generating unit 23 determines the distances to the three-dimensional candidate models from the cameras based on a ratio of the size of a circumscribed rectangle about the observed silhouettes and the size of a circumscribed rectangle about the candidate silhouettes.

The three-dimensional position of the person computed from the observed silhouettes lacks accuracy irrespective of the number of cameras. Therefore, the candidate silhouette-generating unit 23 locates the three-dimensional candidate models at various positions surrounding the estimated three-dimensional position to generate the candidate silhouettes. The candidate silhouettes are obtained by projecting the three-dimensional candidate models onto the image plane. In this case, the image plane is divided into a region where a three-dimensional candidate model is projected and region where the three-dimensional candidate model is not projected. In processing that follows, the region where the candidate is projected is used as an inner region of the candidate silhouettes.

The optimum posture selection unit 24 calculates the similarities between the candidate silhouettes and the observed silhouettes. The optimum posture selection unit 24 selects the candidate silhouette having the highest similarity. The optimum posture selection unit 24 outputs the posture of the selected candidate silhouette as the estimated posture of the present frame. The estimated posture is input to the posture correction unit 3. Further, the estimated posture of the present frame is also used for generating the candidate posture by the candidate posture-generating unit 22 in the next frame as described above.

The optimum posture selection unit 24 calculates the similarities between the candidate silhouettes and the observed silhouettes. The optimum posture selection unit 24 computes the interior occupation ratio by dividing the area of the region where the inner region of the candidate silhouette overlaps the inner region of the observed silhouette, by the area of the inner region of the observed silhouette. Next, the optimum posture selection unit 24 computes the exterior occupation ratio by dividing the area of the region where the outer region of the candidate silhouette overlaps the inner region of the observed silhouette, by the area of the outer region. The outer region of the candidate silhouette is a region defined by a minimum circumscribed rectangle that includes all candidate silhouettes. The rectangle, however, is not included in the candidate silhouettes. Further, the optimum posture selection unit 24 calculates the difference between the interior occupation ratio and the exterior occupation ratio to find an evaluation value of the candidate silhouette.

When there are a plurality of cameras, the optimum posture selection unit 24 calculates evaluation values for the observed silhouettes obtained from the images of these cameras. The optimum posture selection unit 24 averages the calculated evaluation values to find an evaluation value for the candidate silhouettes.

The evaluation value ranges from 0 to 1. When the observed silhouette is the same as the candidate silhouette, the evaluation value is 1. When there is no common point between the observed silhouette and the candidate silhouette, the evaluation value is 0. As the observed silhouette increasingly resembles the candidate silhouette, the evaluation value approaches 1, depending upon the degree of similarity. The evaluation value is used as an index of similarity for the candidate silhouettes.

The computational cost becomes large if the similarity is calculated for all c and i date postures. In order to decrease the computational cost, therefore, the posture-estimating unit 2 uses an optimum posture search strategy by utilizing search trees of two layers as described below. First, the optimum posture selection unit 24 arranges the posture candidates in order of decreasing distance between the estimated posture of the preceding frame and the posture candidates. The difference d1 or d2 stated above can be used for evaluating this similarity. The optimum posture selection unit 24 selects every n-th posture from the ordered posture candidates as the postures of the first layer of the tree structure. The optimum posture selection unit 24 creates the second layer using the remaining postures, and links the remaining postures to the posture it most closely resembles in the first layer.

Next, by using the candidate silhouette-generating unit 23, the optimum posture selection unit 24 calculates the candidate silhouettes of the postures in the first layer. The optimum posture selection unit 24 calculates the similarity to the observed silhouettes at various positions around the three-dimensional positions estimated for the candidate silhouettes, and the highest similarity for each position is used as the similarity for the candidate posture. The optimum posture selection unit 24 selects k postures having high similarity from all the postures in the first layer. The optimum posture selection unit 24 similarly calculates the similarities of the postures in the second layer linked to the k selected postures in the first layer. Finally, the optimum posture selection unit 24 selects a posture having the highest degree of similarity as the estimated posture out of all postures for which a similarity has been calculated.

The candidate silhouette-generating unit 23 is capable of further decreasing the computational cost by generating candidate silhouettes only for the postures whose similarities are to be computed during the tree search. Instead of generating the candidate silhouettes by locating the three-dimensional models at various three-dimensional positions, when the 3D positions varies in very small amounts, the candidate silhouettes are generated only once at an average 3D position and the generated silhouette may be shifted and expanded or contracted to substitute for the silhouette with various 3D positions. Further, the candidate silhouette may be calculated in advance instead of calculating at the time of estimating the posture. That is, the three-dimensional models based on the three-dimensional figure data are located at every three-dimensional position that can be obtained, and the candidate silhouettes are calculated and stored for each position.

The posture-estimating unit 2 selects any one of the postures registered in the posture dictionary B as an estimated posture. When the posture dictionary B stores a large amount of postures reflecting fine changes between the postures, the precision of the estimated posture becomes high. Therefore, this heightens the quality (particularly, smoothness of motion) of the image generated based on the estimated posture.

When few postures are registered in the posture dictionary B, it becomes difficult to reflect fine changes between the postures. In this case, the estimated posture has low precision and is likely to oscillate. When an image of high quality is required (e.g., fashion show), the image generated by using the above estimated posture may not be capable of maintaining sufficient quality.

Figure 3:
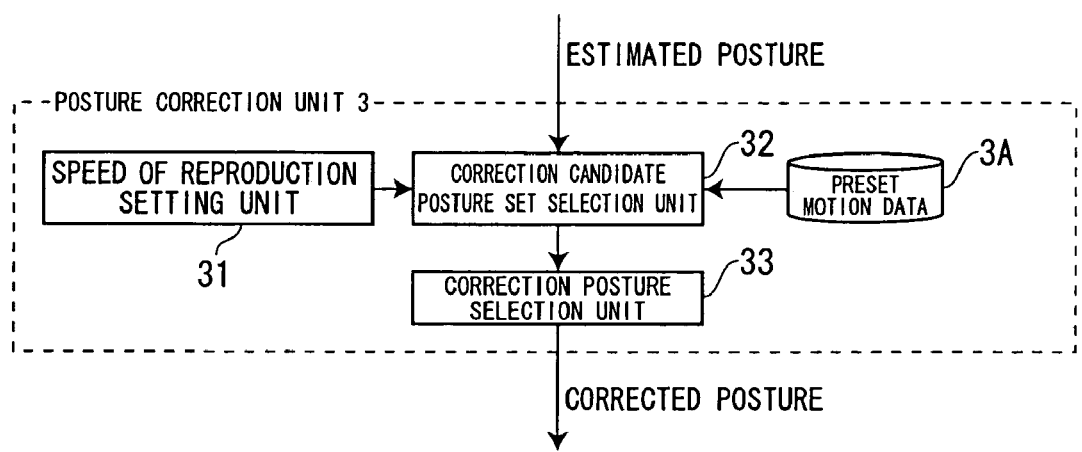
FIG. 3 is a block diagram of a posture correction unit.

As shown in FIG. 3, therefore, the posture correction unit 3 corrects the time series data of the estimated postures into a smooth and natural motion. The preset motion data 3A is the time series posture data that has been obtained in advance from previously estimated postures. A speed of reproduction setting unit 31 sets an upper limit and a lower limit as the speed for reproducing the preset motion data 3A. By using the posture for preset motion data selected in the preceding frame as well as the lower and upper limits on reproduction speed, the correction candidate posture set selection unit 32 selects a plurality of postures appropriate for the present frame as correction candidate postures. From these correction candidate postures, a posture selection unit 33 selects the frame having the posture closest to the estimated posture output from the posture-estimating unit 2, and outputs this frame to a clothes simulation unit 4. Thus, it is possible to vary the speed for reproducing the preset motion data depending upon the estimated posture.

Figure 6:
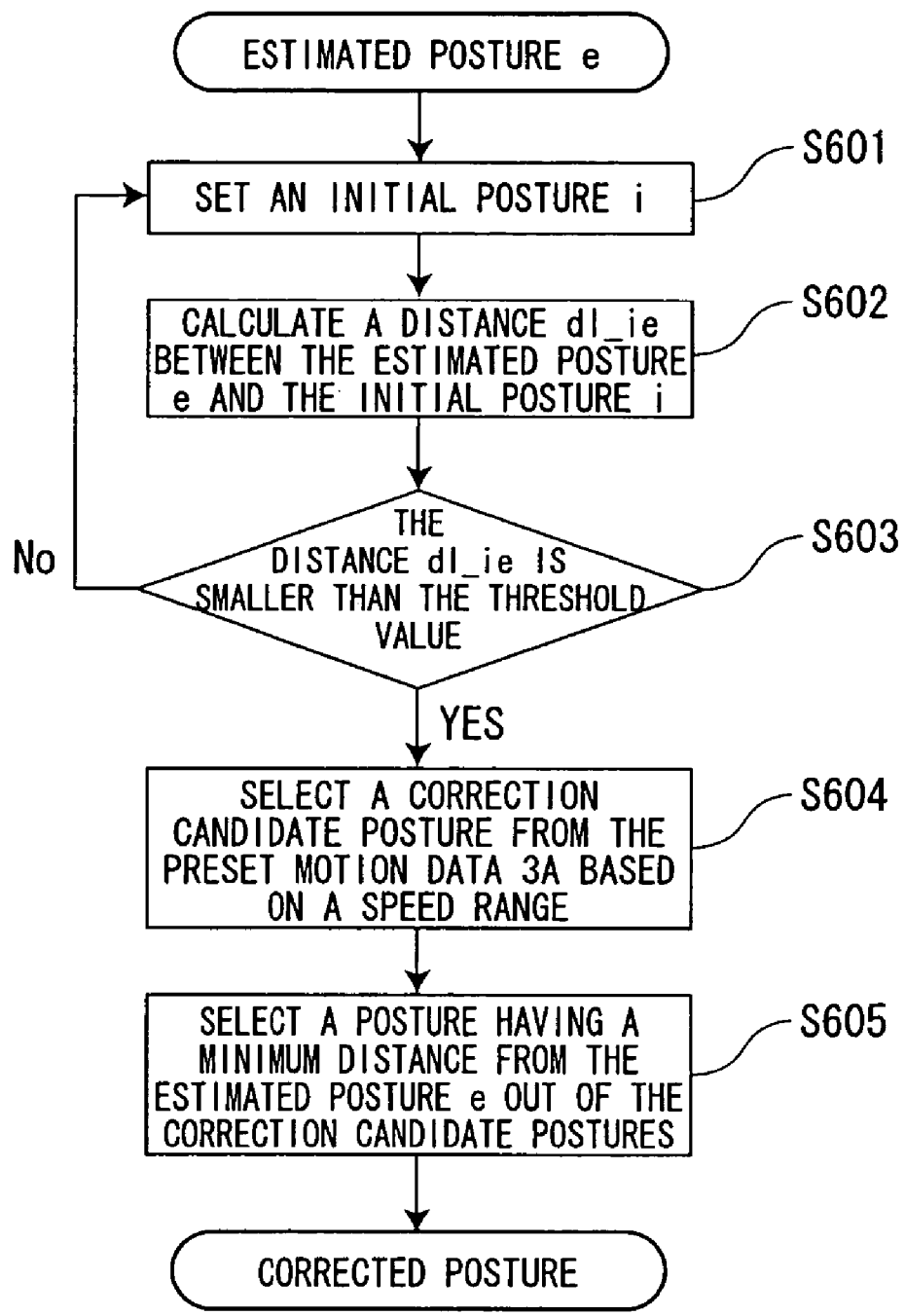
FIG. 6 is a flowchart of a processing of the posture correction unit.

Correction processing in the posture correction unit 3 is described below with reference to FIG. 6.

(Step S601) An initial posture i is obtained from preset motion data 3A.

(Step S602) A distance d1_ie is calculated between the estimated posture e and the initial posture i.

(Step S603) The distance d1_ie is compared with a threshold value. When d1_ie is greater than the threshold value, the routine returns back to step S602. When d1_ie is smaller than the threshold value, the processing of the next step is executed.

(Step S604) Select correction candidate postures out of the preset motion data 3A. First, calculate a possible time range in the preset motion data at the present time based on a speed range determined by the upper and lower limits on reproduction speed. Then, select postures in this time range out of the preset motion data 3A. These selected postures are correction candidate postures.

(Step S605) Out of the correction candidate postures, select the posture with the minimum difference from the estimated posture e. This is the corrected posture.

Though the embodiment has dealt with a method of using the preset motion data 3A, it is also possible to not use the preset motion data. For example, low-pass filters can be used for the time series data of the joint angles to smooth changes in the joint angles. Or, polynomials can be applied to the time series data of the past joint angles to suppress the oscillation of the estimated postures.

The clothes simulation unit 4 determines the motion of the clothes. The clothes simulation unit 4 expresses the surfaces of the clothes by a set of polygons based on the clothes figure data C. The clothes simulation unit 4 calculates the positions of vertexes of polygons while considering contact between vertexes of polygons of the three-dimensional figure models and contact among articles of clothing. The clothes simulation unit 4 determines the motion of the clothes by using an existing clothing motion simulation method. For example, methods can be employed that are disclosed in JP-A-2003-263632 and in H. N. Ng, and R. L. Grimsdale: Computer Graphics Techniques for Modeling Cloth, IEEE Computer Graphics and Applications, Vol. 16, pp. 28-41, 1996.

The clothes simulation unit 4 forms images of the clothes by using the positions of vertexes of the calculated polygons and the clothes figure data C.

The display unit 5 displays the images of the clothes overlapped on the images of the person obtained from the image capturing unit 1. The display unit 5 does not display those portions of the clothes concealed by the body of the person. Therefore, the display portion 5 finds an occlusion relationship between the clothes and the person within the image plane. This occlusion relationship is based upon the three-dimensional coordinates of vertexes of polygons on the clothes computed by the clothes simulation unit 4 and based upon the three-dimensional coordinates of points of the three-dimensional figure models assuming the corrected posture generated by the posture correction unit 3. The display unit 5 synthesizes the images of the clothes on the images of the person based on the occlusion relationship and displays the synthesized images.

As described above, the virtual clothing modeling apparatus of this embodiment of the invention is capable of displaying clothing overlaid on an image of a person Thus, the person is able to virtually try on the clothes while maintaining a natural motion as if they were actually trying on the clothes.

Further, the virtual clothing modeling apparatus according to the embodiment of the invention estimates the postures of the person. The posture estimates are done by successively comparing the images of the person with the data obtained by forming the three-dimensional figure data. This data is obtained by using the posture dictionary, and projecting the data onto the image plane. Thus, posture can be estimated while maintaining stability even if the operation is carried out for a long period of time.

The virtual clothing modeling apparatus described in the above embodiment can be partly or wholly realized by using a program that operates on a computer.

MODIFIED EXAMPLE 1

Figure 4:
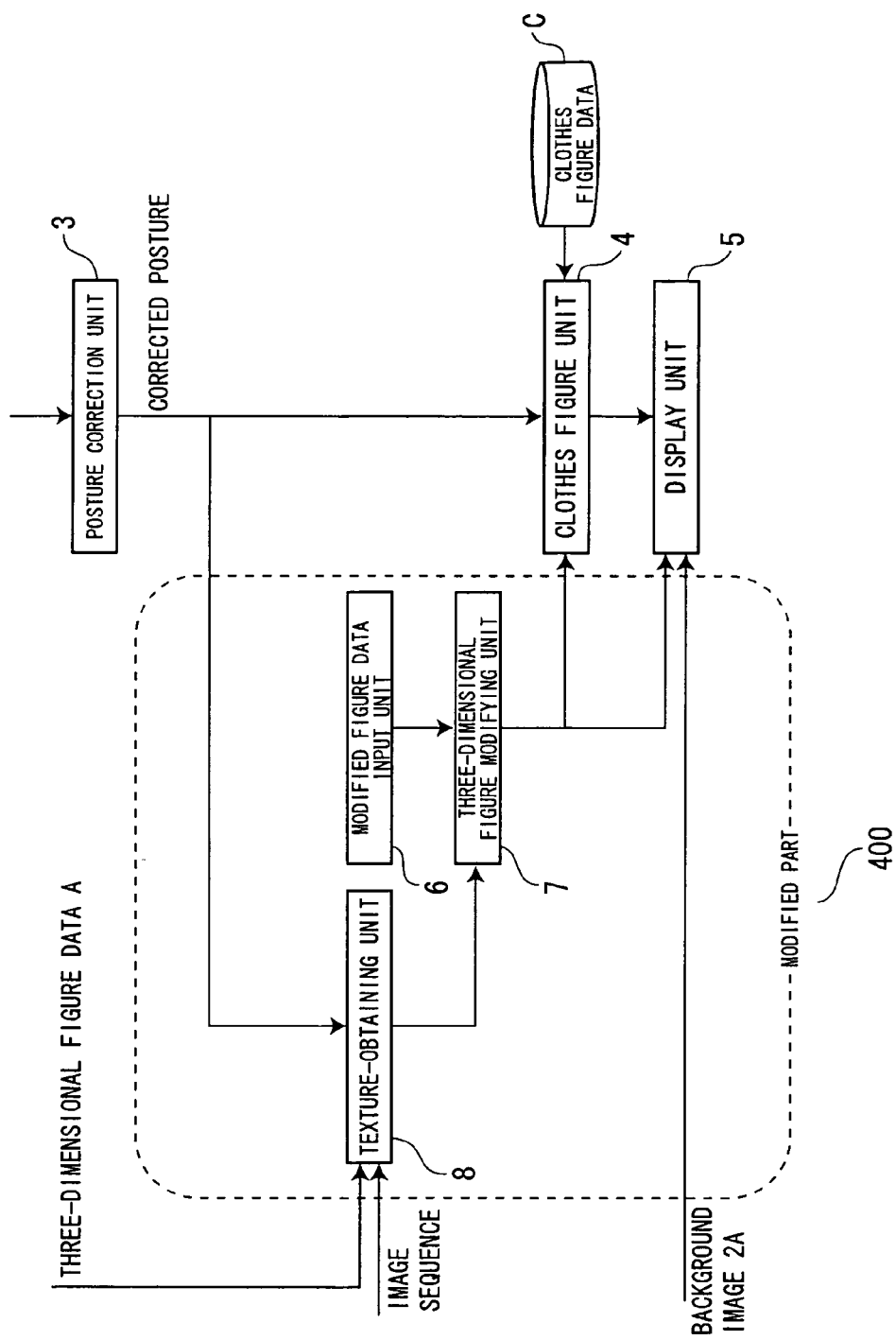
FIG. 4 is a block diagram of a virtual modeling apparatus for displaying the figure in a modified manner.

The modified example deals with a virtual clothing modeling apparatus capable of displaying the figure of the person trying on clothing while modifying the figure in a desired manner. FIG. 4 illustrates a virtual clothing modeling apparatus according to the modified example. In FIG. 4, the modified part 400 represents the portion of the apparatus that differs between the modified example and the above embodiment.

A texture-obtaining unit 8 forms the three-dimensional figure data A into a corrected posture and projects it onto the image plane. The texture-obtaining unit 8 finds textures of polygons of the three-dimensional figure data. Polygons of the three-dimensional data are projected onto the image plane together with the three-dimensional figure data. The texture-obtaining unit 8 obtains the brightness values or the color data of the regions corresponding to the polygons in the current image as the textures for those polygons.

A figure modifying data input unit 6 receives modifying data including height, weight, lengths of various portions and thicknesses of the portions of the body after modification. For instance, the person inputs the modifying data into the figure modifying data input unit 6 by using a keyboard or ten keys.

A three-dimensional figure modifying unit 7 modifies the three-dimensional figure data by using the modifying data that the person input to the figure modifying data input unit 6.

The clothes simulation unit 4 generates the motions of the clothes and the images of the clothes by using the modified three-dimensional figure data and the clothes data.

The display unit 5 displays an image on the background image 2A that has been obtained in advance. The displayed image is obtained by synthesizing the modified three-dimensional figure data with texture and with the image of the clothes output from the clothes simulation unit 4.

If the figure of the person is modified to become smaller than the initial figure, the background that is close to the person is occluded in the initial image. However, the virtual clothing modeling apparatus of this modified example uses the background image 2A and is capable of beautifully displaying the image even in the occluded background regions.

MODIFIED EXAMPLE 2

Figure 5:
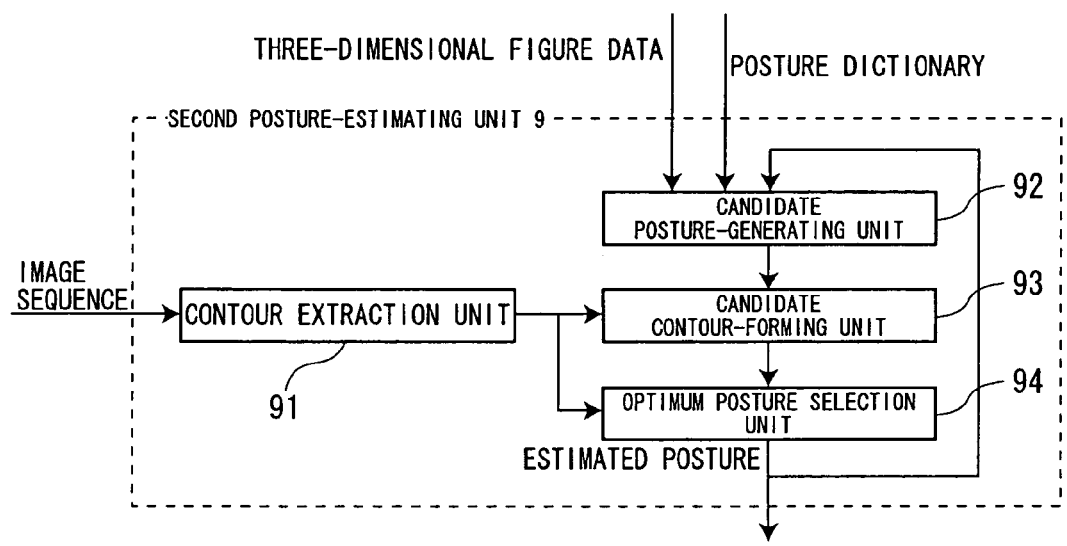
FIG. 5 is a block diagram of a second posture-estimating unit.

This modified example deals with a virtual clothing modeling apparatus in which the posture-estimating unit 2 employs a modified method for calculating the similarity between the posture of the person and the candidate posture. A second posture-estimating unit 9 in FIG. 5 is a modified version of the posture-estimating unit 2 of the above embodiment. The second posture-estimating unit 9 calculates the similarity between the posture of the person and the candidate posture by using contours.

An contour extraction unit 91 finds an observed contour by detecting edges by applying an edge detection operator, such as Sobel operator, to an image of the present frame in the image sequence.

A candidate contour generating unit 93 projects, onto the image plane, the three-dimensional figure data that have been formed into the candidate posture by a candidate posture-generating unit 92. The candidate contour generating unit 93 extracts, as a candidate contour, a boundary between the region where the three-dimensional figure data were projected on the image plane and the region where the three-dimensional figure data were not projected.

An optimum posture selection unit 94 calculates an evaluation value, related to the similarity, in a manner as described below. The evaluation value is calculated based on the candidate contour and the observed contour. The optimum posture selection unit 94 sets evaluation points on the candidate contour for calculating the evaluation values. The optimum posture selection unit 94 finds the closest points on the observed contour for the respective evaluation points and calculates the distances between the two points. The optimum posture selection unit 94 sets the evaluation value to the average value of the distances calculated for the evaluation points. The similarity between the postures is evaluated based on the evaluation value.

In this modified example, the difference between the candidate posture and the posture of the person trying on clothing decreases as the evaluation value decreases. In other words, the similarity between the postures increases. On the other hand, the difference between the candidate posture and the posture of the person increases as the evaluation value increases, in other words, the similarity decreases.

In this modified example, the evaluation value becomes the "smallest" when the similarity is the "greatest", and the evaluation value becomes the "greatest" when the similarity is the "smallest".

Other possibilities for an evaluation value include the sum of the distances, the median or the mode. Further, the evaluation value can be scaled so that it can be directly compared to similarity values, or the similarity may be evaluated by taking into consideration the relationship between the magnitude of the evaluation value and the degree of similarity.

The following method can be used for scaling the evaluation value for comparison with the similarity. First, the evaluation value is clipped by the upper-limit value A. Namely, when the evaluation value exceeds the upper-limit value A, the evaluation value is corrected to be the upper-limit value A. The evaluation value is used without being corrected when it is between 0 and the upper-limit value A. The evaluation value that is clipped is divided by the upper-limit value A. Then, the quotient obtained by the division is subtracted from 1. From a series of these calculations, similarities assuming a value from 0 to 1 are found. Other methods for scaling the evaluation value may be used.

The virtual clothing modeling apparatus of this modified example estimates the posture of the person by using contours, and is capable of estimating posture while maintaining stability even when there is a change in the brightness of the image.

MODIFIED EXAMPLE 3

This modified example deals with a virtual clothing modeling apparatus for estimating the posture of a person trying on clothing by using both silhouettes and contours.

First, by using the method described above, similarities are found based on both silhouettes and contours. Then, the optimum posture selection unit of this modified example finds an integrated similarity by using the above two kinds of similarities. As described above, the similarity based on the silhouette and the similarity based on the contour assume values of 0 to 1, and the values of the similarity become 1 when they are in perfect agreement. When the scales of the two kinds of similarities are not the same, they may be adjusted to be the same.

The optimum posture selection unit of this modified example uses the sum of the similarity based on the silhouette and the similarity based on the contour as the integrated similarity.

The optimum posture selection unit of this modified example selects a posture having the highest integrated similarity as the estimated posture.

Here, a weighted sum of the two kinds of similarities, a simple average thereof, a weighted average thereof or a maximum value thereof may be used as the integrated similarity.

Numerous modifications of the present invention are possible in light of the above teachings. It is therefore to be understood that, within the scope of the appended claims, the present invention can be practiced in a manner other than as specifically described herein.

What is claimed is:

1. A virtual clothing modeling apparatus comprising:
a camera to obtain an image sequence including a plurality of images of a person who tries on clothing;
a storage unit to store clothes data including three-dimensional figures of clothes and patterns thereof, three-dimensional figure data of the person, and posture data of the person;
a posture-estimating unit to estimate the posture of the person in the images within the image sequence by using the image sequence and the stored posture data;
a time series posture data generating unit to generate time series posture data by using the estimated posture data of the person;
a clothes-simulating unit to estimate the motions of the clothes tried on by the person by using the three-dimensional figure data of the person, the clothes data, and the time series posture data;
a clothes image-generating unit to generate images of the clothes based on the estimated motions of the clothes; and
a synthesizing unit to synthesize images of the clothes on the person in the image sequence by using the estimated motions of the clothes and the clothes data;
wherein the posture-estimating unit includes:
a candidate mode selecting unit to select posture data for a plurality of posture candidates which are similar to the previously estimated posture data of the person;
a candidate model generating unit to generate a plurality of candidate models by forming three-dimensional figure data using a plurality of posture data candidates; and
a present posture-estimating unit to estimate the present posture of the person based on evaluation values which indicate similarities between the person in the images and the candidate models;
wherein the previously estimated posture data is selected from posture data representing a plurality of postures; and
wherein the posture data candidates selected by the candidate mode selecting unit are candidates whose similarities exceed a threshold.

2. The virtual clothing modeling apparatus according to claim 1, wherein the present posture-estimating unit in the posture-estimating unit includes:
a silhouette extracting unit to extract a silhouette of the person, the silhouette representing a region occupied by the person in the images;
a silhouette calculation unit to calculate candidate model silhouettes which represent the regions occupied by the candidate models on an image plane, the candidate model silhouettes being obtained by projecting the candidate models onto the image plane;
an evaluation value calculation unit to calculate silhouette evaluation values relating to the silhouettes of the candidate models; and
a model selection unit to select a model from the candidate models, the selected model having the silhouette evaluation value satisfying a predetermined condition;
wherein the evaluation values are based upon areas where inner regions of the candidate model silhouettes and inner regions of the silhouette of the person overlap and where outer regions of the candidate model silhouettes and the inner region of the silhouette of the person overlap; and
wherein the present posture-estimating unit estimates the present posture date of the person by using the posture data candidate of the selected model.

3. The virtual clothing modeling apparatus according to claim 2, wherein:
the storage unit further stores preset time series posture data including time series posture data for the person, and
the time series posture data generating unit includes:
a speed-setting unit for setting a range of speed for motions that can be expressed based on the preset time series posture data;
a data set selecting unit to select a set of posture data for the present frame in the image sequence from the preset time series posture data, based upon the posture data of the person in the image one frame before the present frame of the image sequence, and based upon the speed range; and
a correction data selecting unit to select, from the set of posture data, correction data which is posture data having similarities to the posture data of the person;
wherein the correction data includes those postures determined by the posture-estimating unit to have similarities to the posture data of the person that are higher than a threshold; and
wherein the time series posture data-generating unit generates the time series posture data by correcting the posture data of the person with the correction data.

4. The virtual clothing modeling apparatus according to claim 3, further comprising:
a texture-obtaining unit to obtain texture data of the person from the image of the present frame in the image sequence;
a data input unit to input modification data for modifying the three-dimensional figure data of the person;
a figure-modifying unit to modify the three-dimensional figure data of the person based on the modification data; and
a modified figure image generating unit to generate a modified figure image, which is an image of the person after the figure is modified by using the modified three-dimensional figure data of the person and the texture data of the person;
wherein the storage unit further stores a background image obtained in advance;
wherein the clothes-simulating unit estimates the motions of the clothes by using the modified three-dimensional figure data of the person; and
wherein the synthesizing unit synthesizes the modified figure image and the images of the clothes on the background image.

5. The virtual clothing modeling apparatus according to claim 2, wherein the present posture-estimating unit in the posture-estimating unit further includes:
a contour extracting unit to extract one or more contours of the person in the images; and
a contour calculation unit to calculate the contours of the candidate models by projecting the candidate models onto the image plane;
wherein the evaluation value calculation unit in the present posture-estimating unit further calculates contour evaluation values, based on the distances from points on the contours of the candidate models to the closest points on the contour of the person; and wherein the model selection unit selects, from the candidate models, a model with a silhouette evaluation value and a contour evaluation value satisfying predetermined conditions.

6. The virtual clothing modeling apparatus according to claim 5, wherein the storage unit further stores preset time series posture data, including time series posture data for the person trying on clothing, and the time series posture data generating unit includes:
a speed-setting unit to set a range of speed for motions that can be expressed based on the preset time series posture data;
a date set selecting unit to select a set of posture data for the present frame in the image sequence from the preset time series posture data, based upon the posture data of the person in the image one frame before the present frame of the image sequence, and based upon the speed range; and
a correction data selecting unit to select, from the set of posture data, correction data which is posture data having similarities to the posture data of the person;
wherein the correction data consists of those postures determined by the posture-estimating unit to have similarities to the posture data for the person that are higher than a threshold; and
wherein the time series posture data-generating unit generates the time series posture data by correcting the posture data of the person with the correction data.

7. The virtual clothing modeling apparatus according to claim 5, further comprising:
a texture-obtaining unit to obtain texture data of the person from the image of the present frame in the image sequence;
a data input unit to input modification data for modifying the three-dimensional figure data of the person;
a figure-modifying unit to modify the three-dimensional figure data of the person based on the modification data; and
a modified figure image-generating unit to generate a modified figure image, which is an image of the person after the figure is modified by using the modified three-dimensional figure data of the person and the texture data of the person;
wherein the storage unit further stores a background image obtained in advance;
wherein the clothes-simulating unit estimates the motions of the clothes by using the modified three-dimensional figure data of the person; and
wherein the synthesizing unit synthesizes the modified figure image and the images of the clothes on the background image.

8. The virtual clothing modeling apparatus according to claim 1, wherein the present posture-estimating unit in the posture-estimating unit includes:
a contour extracting unit to extract one or more contours of the person in the images in the image sequence;
a contour calculation unit to calculate contours of the candidate models by projecting the candidate models onto the image plane;
an evaluation value calculation unit to calculate contour evaluation values for the candidate models, based on the distances from points on the contours of the candidate models to the closest points on the contour of the person; and
a model selection unit to select, from the candidate models, a model with a contour evaluation value satisfying predetermined conditions;

wherein the present posture-estimating unit estimates the present posture data of the person by using the posture data candidate of the selected model.

9. A virtual clothing modeling apparatus comprising:
a camera to obtain an image sequence including a plurality of images of a person who tries on clothing;
a storage unit to store clothes data including three-dimensional figures of clothes and patterns thereof, three-dimensional figure data of the person, and posture data of the person;
a posture-estimating unit to estimate the posture of the person in the images within the image sequence by using the image sequence and the stored posture data;
a time series posture data generating unit to generate time series posture data by using the estimated posture data of the person;
a clothes-simulating unit to estimate the motions of the clothes tried on by the person by using the three-dimensional figure data of the person, the clothes data, and the time series posture data;
a clothes image-generating unit to generate images of the clothes based on the estimated motions of the clothes; and
a synthesizing unit to synthesize images of the clothes on the person in the image sequence by using the estimated motions of the clothes and the clothes data;
wherein the storage unit further stores preset time series posture data including time series posture data for the person, and the time series posture data generating unit includes:
a speed-setting unit to set a range of speed for motions that can be expressed based on the preset time series posture data;
a data set selecting unit to select a set of posture data for the present frame in the image sequence from the preset time series posture data, based upon the posture data of the person in the image one frame before the present frame of the image sequence, and based upon the speed range; and
a correction data selecting unit to select, from the set of posture data, correction data which is posture data having similarities to the posture data of the person;
wherein the correction data includes those postures determined by the posture-estimating unit to have similarities to the posture data of the person that are higher than a threshold; and
wherein the time series posture data-generating unit generates the time series posture data by correcting the posture data of the person with the correction data.

10. A virtual clothing modeling apparatus comprising:
a camera to obtain an image sequence including a plurality of images of a person who tries on clothing;
a storage unit to store clothes data including three-dimensional figures of clothes and patterns thereof, three-dimensional figure data of the person, and posture data of the person;
a posture-estimating unit to estimate the posture of the person in the images within the image sequence by using the image sequence and the stored posture data;
a time series posture data generating unit to generate time series posture data by using the estimated posture data of the person;
a clothes-simulating unit to estimate the motions of the clothes tried on by the person by using the three-dimensional figure data of the person, the clothes data, and the time series posture data;

a clothes image-generating unit to generate images of the clothes based on the estimated motions of the clothes;

a synthesizing unit to synthesize images of the clothes on the person in the image sequence by using the estimated motions of the clothes and the clothes data;

a texture-obtaining unit to obtain texture data of the person from the image of the present frame in the image sequence;

a data input unit to input modification data for modifying the three-dimensional figure data of the person;

a figure-modifying unit to modify the three-dimensional figure data of the person based on the modification data; and a modified figure image-generating unit to generate a modified figure image, which is an image of the person after the figure is modified by using the modified three-dimensional figure data of the person and the texture data of the person;

wherein the storage unit further stores a background image obtained in advance;

wherein the clothes-simulating unit estimates the motions of the clothes by using the modified three-dimensional figure data of the person; and wherein the synthesizing unit synthesizes the modified figure image and the images of the clothes on the background image.

* * * * *